A. PILLEP & D. MAYER.
Horse-Detachers.

No. 155,336.

Patented Sept. 22, 1874.

UNITED STATES PATENT OFFICE.

AUGUSTUS PILLEP AND DANIEL MAYER, OF MILWAUKEE, WISCONSIN.

IMPROVEMENT IN HORSE-DETACHERS.

Specification forming part of Letters Patent No. 155,336, dated September 22, 1874; application filed July 30, 1874.

*To all whom it may concern:*

Be it known that we, AUGUSTUS PILLEP and DANIEL MAYER, of Milwaukee, in the county of Milwaukee, in the State of Wisconsin, have invented certain Improvements in Horse-Detachers, of which the following is a specification:

Our improvement is for the purpose of detaching a horse from a buggy or wagon, if he is frightened and starts to run away. The person in the buggy can draw on the line from the detacher in the buggy, and the tugs will be released from the whiffletree, and the horse will be detached from the buggy.

Figure 1:
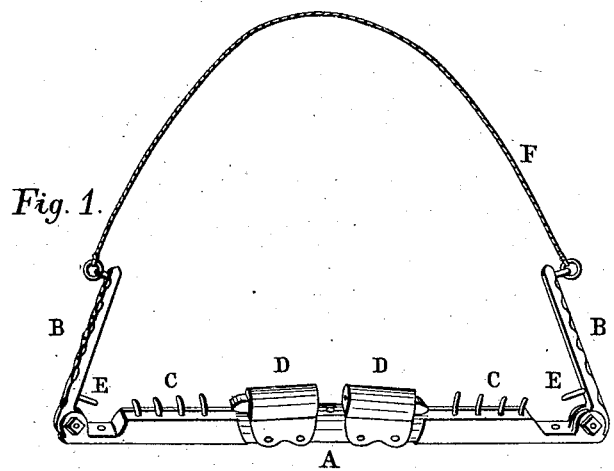
Figure 2:
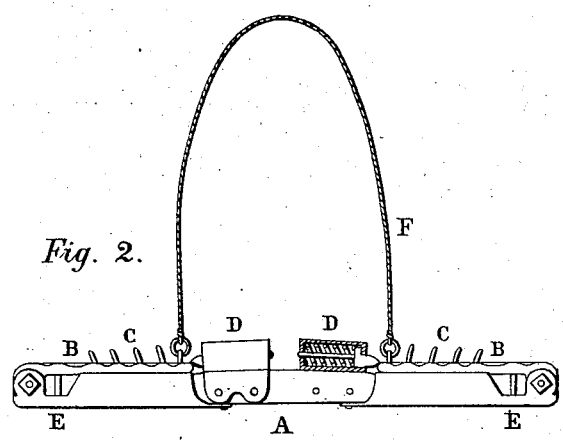

Figure 1 is a view of the whiffletree with the detacher open, and Fig. 2 is a view of the whiffletree with the detacher closed and ready for work.

A is the whiffletree; B B, the levers, hung by hinges at their ends, at the ends of the whiffletree; C C, pins in the whiffletree, which pass through holes in the levers and hold them firmly in place; D D, a spring-catch, which holds the ends of levers B B down, and will let go of them when the line is drawn on; E E, pins in the levers, passing down into holes in the whiffletree, which hold the end of the tugs. These pins are bent forward so that when the levers are raised the tugs will slip off of the pins and relieve the horse. F, the line attached to the ends of the levers, so that, when it is necessary to release the horse, pull on the line F and the horse will be detached.

This horse-detacher is old, with the exception of the spring-catches D D, which are new, and is an improvement on the invention of Augustus Pillep and William Illman, patented May 5, 1874.

We claim as our invention—

Spring-catches D D, in combination with handles B B and pins C and E, substantially as described.

AUGUSTUS PILLEP.
DANIEL MAYER.

Witnesses:
J. B. SMITH,
E. J. SMITH.